(12) United States Patent
Enomoto et al.

(10) Patent No.: US 7,791,244 B2
(45) Date of Patent: Sep. 7, 2010

(54) MULTIPHASE CLAW-POLE TYPE ELECTRIC ROTARY MACHINE, COGGING TORQUE ADJUSTMENT SYSTEM OF THE SAME, GENERATOR SYSTEM, AND MOTOR SYSTEM

(75) Inventors: Yuji Enomoto, Hitachi (JP); Motoya Ito, Hitachinaka (JP); Ryoso Masaki, Hitachi (JP); Shoji Ohiwa, Saitama (JP); Chio Ishihara, Tokyo (JP)

(73) Assignees: Hitachi Industrial Equipment Systems Co., Ltd., Tokyo (JP); Hitachi Powdered Metals Co., Ltd, Chiba (JP); Nidec Servo Corporation, Gunma (JP)

( * ) Notice: Subject to any disclaimer, the term of this patent is extended or adjusted under 35 U.S.C. 154(b) by 209 days.

(21) Appl. No.: 11/763,481

(22) Filed: Jun. 15, 2007

(65) Prior Publication Data
US 2007/0296285 A1 Dec. 27, 2007

(30) Foreign Application Priority Data
Jun. 16, 2006 (JP) .............................. 2006-166808

(51) Int. Cl.
*H02K 1/12* (2006.01)
*H02K 37/14* (2006.01)
(52) U.S. Cl. .............. 310/257; 310/49.08; 310/216.009
(58) Field of Classification Search ............... 310/49 R, 310/216, 217, 254, 257, 49.01–49.02, 49.08, 310/49.17, 49.31–49.35, 91, 216.009
See application file for complete search history.

(56) References Cited

U.S. PATENT DOCUMENTS

| 4,174,485 | A | * | 11/1979 | Soden et al. | ................... 310/89 |
| 4,942,325 | A | * | 7/1990 | Fukaya | ....................... 310/257 |
| 6,153,953 | A | * | 11/2000 | Isozaki et al. | ............. 310/49 R |
| 6,710,503 | B2 | * | 3/2004 | Yamawaki et al. | .......... 310/257 |
| 7,165,313 | B2 | * | 1/2007 | Haenni | ........................ 29/596 |

FOREIGN PATENT DOCUMENTS

| JP | 07-227075 | | 8/1995 |
| JP | 2004-15998 | A | 1/2004 |
| JP | 2004015998 | A * | 1/2004 |

OTHER PUBLICATIONS

Office Action in Japanese Patent Appln. 200710142197.2, mailed Oct. 16, 2009, with partial English language translation.

* cited by examiner

*Primary Examiner*—Tran N Nguyen
(74) *Attorney, Agent, or Firm*—Antonelli, Terry, Stout & Kraus, LLP.

(57) ABSTRACT

A multiphase claw-pole type electric rotary machine has two or more phases-stator units. The stator units are arranged phase by phase in an axial direction of the electric rotary machine. Each phase stator unit comprises a pair of complementary-opposed claw pole core blocks and a ring-shaped stator coil sandwiched therebetween. The stator units have structures rotatably adjustable independent of each other in their phase positional relations while maintaining concentricity of them after assembly of the rotary machine before being secured.

18 Claims, 11 Drawing Sheets

FIG. 1(c) SECTION A

FIG. 1(d) SECTION B

FIG. 1(e) SECTION C

MULTIPHASE CLAW-POLE TYPE ELECTRIC ROTARY MACHINE, COGGING TORQUE ADJUSTMENT SYSTEM OF THE SAME, GENERATOR SYSTEM, AND MOTOR SYSTEM

CLAIM OF PRIORITY

The present application claims priority from Japanese application serial no. 2006-166808, filed on Jun. 16, 2006, the content of which is hereby incorporated by reference into this application.

FIELD OF THE INVENTION

The present invention relates to the structure of a multiphase claw-pole type electric rotary machine such as a motor and a generator for use in the industrial, household, and vehicle fields.

BACKGROUND OF THE INVENTION

A motor is used as a drive device for converting electric energy in the industrial, household, and vehicle fields to a mechanical output. A claw-pole motor is used for an OA device, a vehicle device, and the like because of its low-cost structure and a simple drive circuit. Usually, the claw-pole motor is used as a two-phase stepping motor as described in Japanese laid-open Patent Application Publication No. H7-227075. Motors are generally classified into a single phase, two phases, and three phases, which are properly used according to uses. Among the motors, the three-phase motor has excellent controllability and has an advantage that it can be driven by using the small number of transistors.

Usually, as described in Japanese laid-open Patent Application Publication No. H7-227075, the material of a stator core in a claw-pole motor of this kind is a rolled steel plate of SPCC or the like. A claw pole part is formed by bending the plate, and a cylindrically-wound coil of stator is sandwiched by a pair of stator core blocks (halves).

Incidentally, if using SPCC as the stator core, an iron loss occurring in the stator core may be prone to become large because SPCC is comparatively inferior in magnetic property.

Furthermore since the SPCC for the stator core is bent into a final product, residual stress occurs in the bent part in the stator core, and the magnetic property further deteriorates due to distortion. Since the bent part is a part on which magnetic flux is particularly concentrated, a large iron loss occurs, and a low-efficient motor may be resulted. Additionally, as an inner side of such a magnetic pole core which is plastic-worked by bending has a cantilever structure, its circularity may be prone to become very low. Due to the influence of the low circularity, the motor may have large cogging torque. Under the present circumstances, the motor is employed for uses which do not require high efficiency, low torque pulsation, low vibration, low noise, and the like.

The present invention is to provide a multiphase claw-pole type electric rotary machine structure (for example, motor structure) capable of reducing cogging torque, and to provide a method of reducing the cogging torque in a multiphase claw-pole type motor with magnetic claw-poles made of a powder magnetic core. The claw-pole type electric rotary machine has a structure in which stator units in respective phases are independent of each other, and the positional relations of the independent phases is brought into move out of the designed relations due to an assembly error and the like. In a three-phase motor, their phases shift by 120° from one to another in electrical angle in the positional relations without assembly error. However, such shift slightly varies due to an error (deviation) which occurs at the time of assembly and the like, and cogging torque due to an error increases. The cycle of the cogging torque occurring due to an error is longer than that of cogging torque determined in designing, and the absolute value of the cogging torque is a few times or tens times as large as that determined in designing. The cogging torque exerts an influence upon torque ripples and smoothness of motor rotation and causes vibration and noise. It is desired to reduce the cogging torque, and the reduction of the cogging torque is an important theme in all of areas to which a motor is applied, for example such as areas of precision machines, household electrical appliances, and vehicles.

SUMMARY OF THE INVENTION

In the present invention, in order to reduce cogging torque caused by an assembly error, after assembly of an electric rotary machine with two or more phases-stator units, phase relations of the stator units are adjusted while measuring the cogging torque caused by the assembly error, thereby minimizing the cogging torque due to the error. In particular, the present invention provides a structure of the electric rotary machine with two or more phases-stator units capable of making an adjustment of phase positional relations of the stator units after assembly. Incidentally, in the assembly error of the electric rotary machine, misalignment of phases becomes the largest cause of the cogging torque increase.

The present invention is characterized in that two or more phases-stator units have structures rotatably adjustable in their circumferential direction independent of each other while maintaining concentricity of them after assembly and before being secured. Thereby, the present invention is capable of making an adjustment of phase positional relations among stator units.

In addition to the above-mentioned invention, the following related system for adjusting cogging torque of a multiphase claw-pole type electric rotary machine is proposed.

The adjusting system, after assembly of the electric rotary machine, rotates one or more stator units in state of fixing the other (one phase stator unit) as reference stator unit while measuring cogging torque of the rotary machine, thereby finds the optimum stator unit-phase positional relations where cogging torque becomes the minimum. After finding the optimum phase positional relations, the stator units are fixed at the optimum position.

According to the present invention, the multiphase claw-pole motor can have small torque pulsation and rotate smoothly.

BRIEF DESCRIPTION OF THE DRAWINGS

FIG. 1($a$) is a longitudinal section showing the structure of a multiphase claw-pole motor of the present invention, FIG. 1($b$) is a partial perspective view of a stator core, and FIGS. 1($c$) to 1($e$) are cross sections of A-A line, B-B line and C-C line of FIG. 1 ($a$) respectively.

FIG. 2($a$) is a diagram showing a mesh model for an FEM analysis of the claw-pole motor of the invention, and FIGS. 2($b$) to 2($d$) are diagrams showing results of an analysis of cogging torque by using the model.

FIG. 3($a$) is a perspective view showing the positional relations of multiple stator cores in the case where there is an error between a phase B and a phase C of the claw-pole motor of the invention.

DETAILED DESCRIPTION OF THE REFERRED EMBODIMENTS

First Embodiment

Figure 1A:
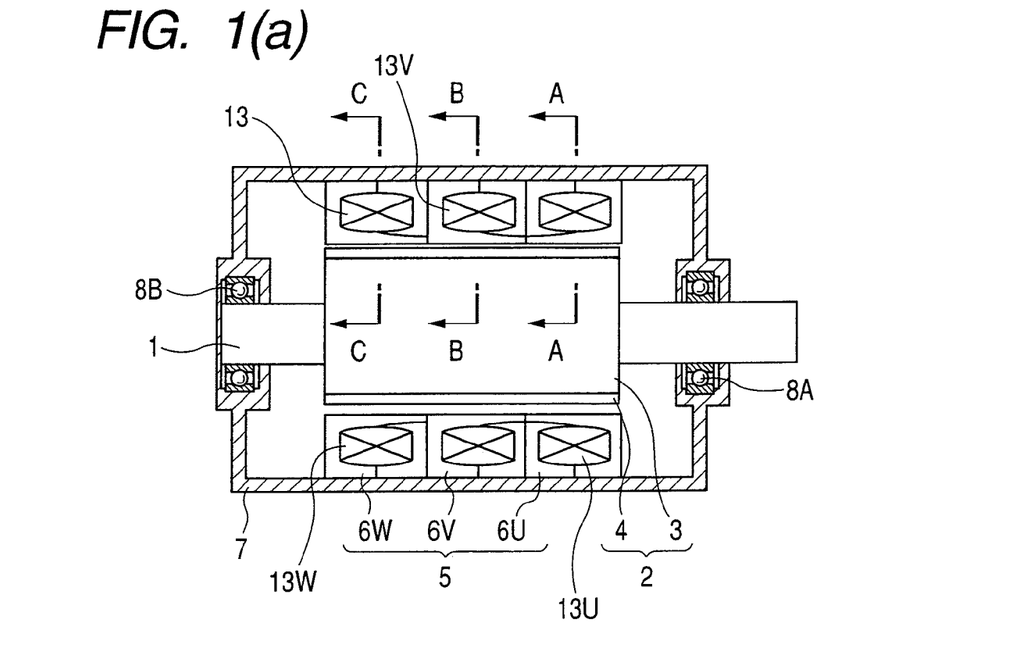

FIGS. 1(a) to 1(e) are perspective view and cross sections showing the structure of a three-phase claw-pole motor having 16 poles. FIG. 1(a) shows a sectional structure of the motor. A rotor 2 of the motor in the embodiment has a ring magnet structure in which a cylindrical rotor core 3 provided with 16 magnet poles 4 is fixed to a shaft 1 by a method of bonding or the like. Both ends in the axial direction of the rotor 2 are rotatably held by bearings 8A and 8B held in a housing 7. A stator 5 is held in the housing 7 and its inner surface faces an outer surface of the rotor 2 with a gap therebetween. The stator 5 of the motor has a structure in which phases are independent of each other. Respective stator units of phases A (u-phase), B (v-phase), and C (w-phase) are disposed in the axial direction, thereby constructing a three-phase motor. Each of multiple-phase stator unit A, B, and C comprises a pair of complementary-opposed claw pole core blocks 6 (6U, 6V, 6W) and a ring-shaped stator coil 13 (13U, 13V, 13W) sandwiched therebetween.

Figure 1B:
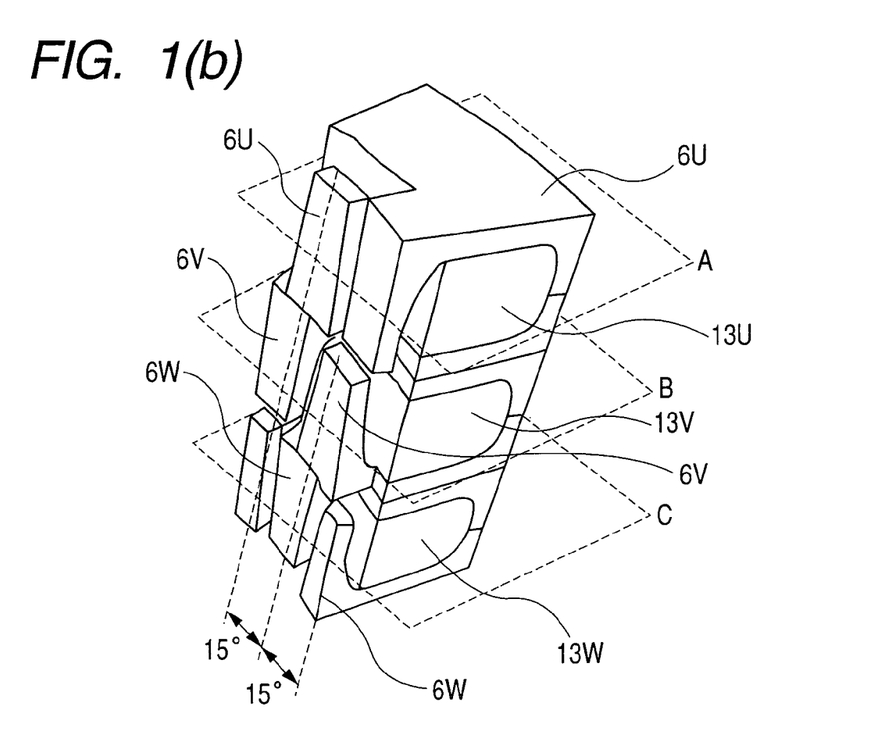
Figure 1C:
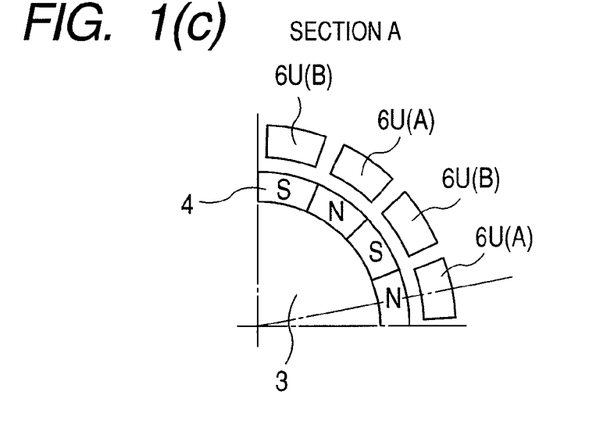
Figure 1D:
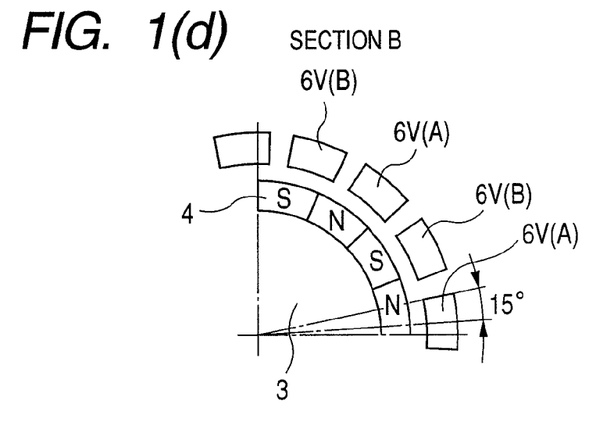
Figure 1E:
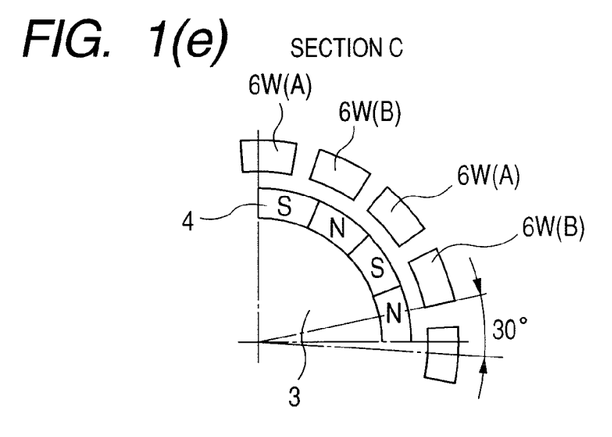

FIG. 1(b) is a perspective view showing the structure of the stator 5. Stator cores (claw pole core blocks) 6U, 6V, and 6W of phases A (A phase-stator unit), B (B phase-stator unit), and C (C phase-stator unit) are arranged in the axial direction so that their positions in the circumferential direction are shifted by 120° in electrical angle. In the 16-pole motor of the embodiment, 120° in electrical angle corresponds to 15° in mechanical angle, and the phases A, B, and C are shifted by 15° in the circumferential direction. FIGS. 1(c), 1(d), and 1(e) are sections of the phases A, B, and C, respectively, and they corresponds on A-A line section, B-B line section, and C-C line section of FIG. 1(a). When positions in the circumferential direction of the poles 4 of the rotor magnet (rotor 2) are as shown in the diagrams, the positions of the poles 4 of the rotor magnet in the sections of the phases A, B, and C are the same. In the section A, the center of each claw pole in the stator core 6U (A phase-stator unit) and the center of each pole 4 of the rotor magnet coincide with each other. In the section B, the position of each claw pole in the stator core 6V (B phase-stator unit) is shifted by 15° from that of the stator core 6U (A phase). In the section C, the position of each claw pole in the stator core 6W (C phase-stator unit) is shifted by 30° from that of the stator core 6U (A phase).

The cogging torque per one phase of the claw-pole motor is determined by the magnitude of a magnetomotive force of the rotor 2 and the shape of each claw pole in the stator 5. The cogging torque can be roughly estimated by designing.

Figure 2A:
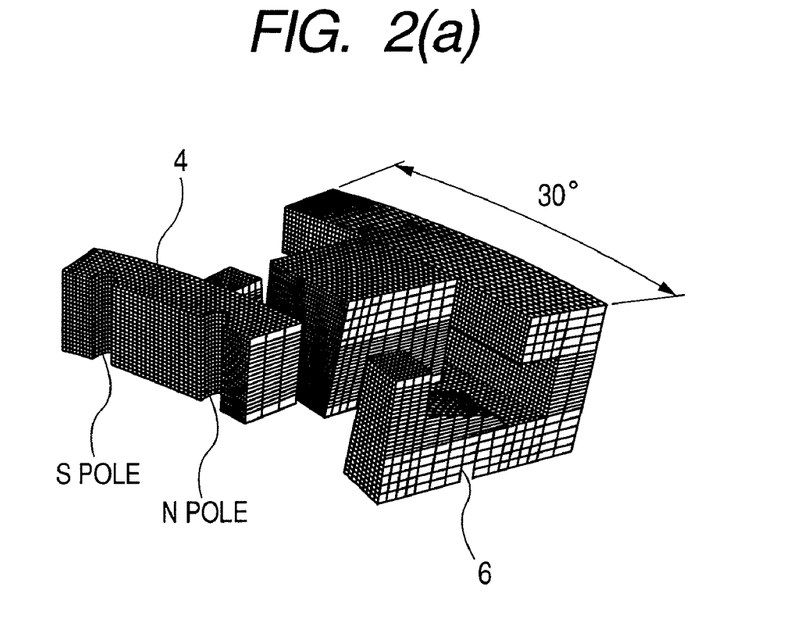
Figure 2B:
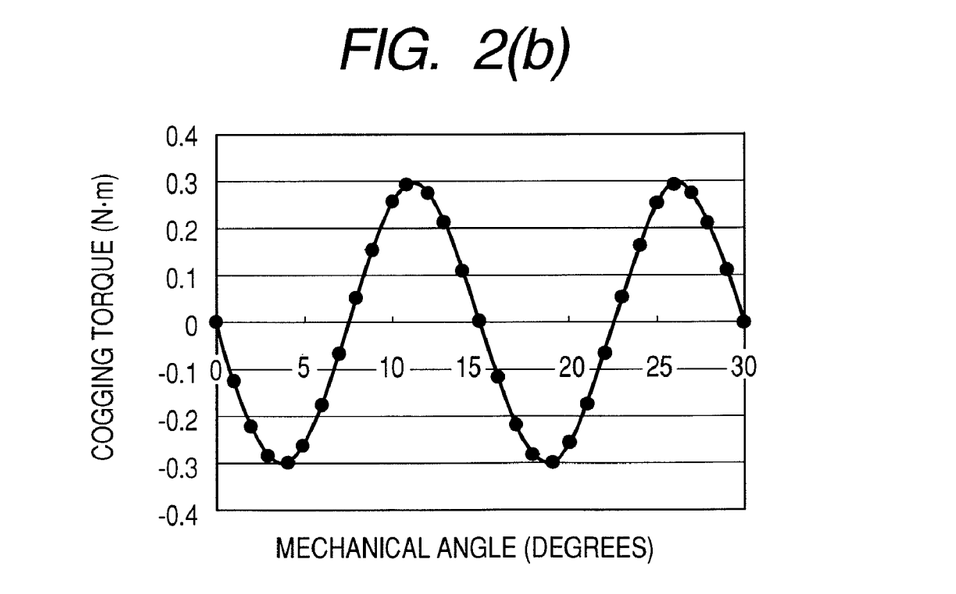
Figure 2C:
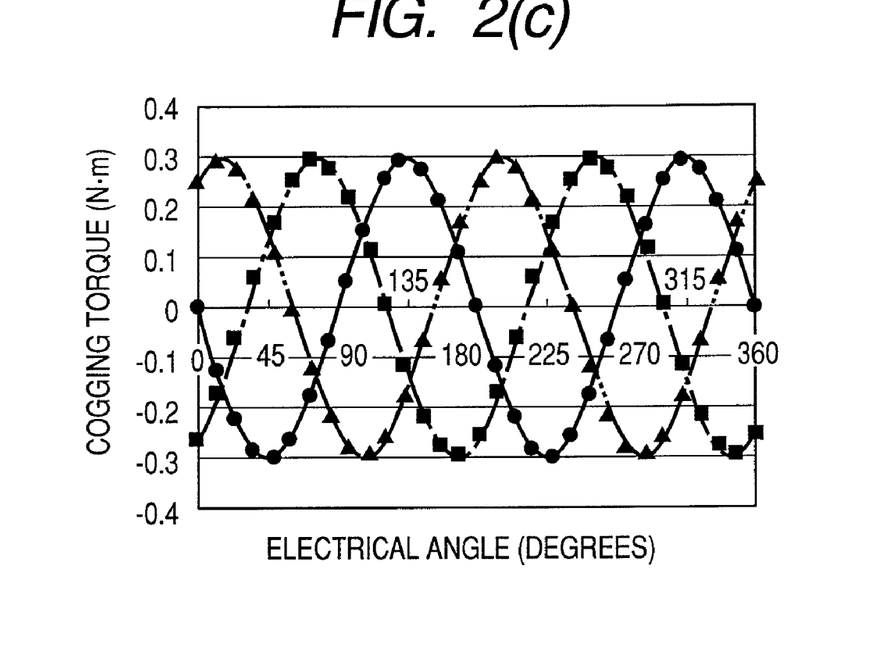
Figure 2D:
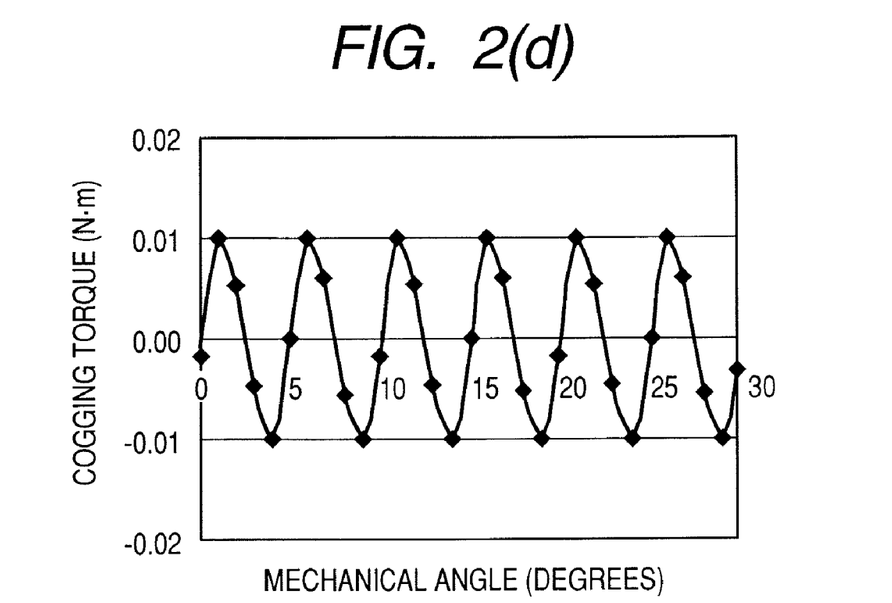

FIGS. 2(a) to 2(d) show an example of calculating cogging torque of the claw-pole motor by using FEM (Finite Element Method). FIG. 2(a) shows a partial perspective diagram as to magnet poles 4 of the rotor 2 and the claw pole of the stator core 6 per one phase, and illustrates an FEM mesh model of one cycle of the electrical angle (mechanical angle of 30°) of a 24-pole claw-pole motor. FIG. 2(b) shows a result of calculation of cogging torque of the motor calculated by using the mesh model which uses magnetic properties of the magnet poles 4 of the rotor 2 and the claw poles of the stator core 6 as input parameters. It is understood from the diagram that when the magnet of the rotor is rotated from 0° to 30°, magnetic flux density in an air gap changes in the relation between each magnet pole 4 of the rotor and the claw poles of the stator core, and torque of two cycles of sine wave is generated. The cogging torque generated in one phase is similarly generated the other phases. As shown in FIG. 1, the positions in the circumferential of the magnet poles 4 of the rotor 2 are the same as each other over the stator units A (6U), B (6V), and C (6W) arranged in the axial direction, but the positions of the claw poles of the 3 phase-stator units A (6U), B (6V), and C (6W) are shifted by 120° in electrical angle. Therefore, cogging torque whose cycle is shifted by 120° in electrical angle from the cycle of the cogging torque of FIG. 2(b) is generated in the phase B, and cogging torque whose cycle is shifted by 120° in electrical angle from the cycle of the cogging torque in the phase B is generated in the phase C. FIG. 2(c) is a diagram showing the cogging torques in the phases. The waveforms (amplitude and cycle) of the cogging torques are the same but only the phases are sequentially shifted by 120°. The cogging torques in the three-phase motor becomes a combined cogging torque in the three phases. FIG. 2(d) shows the waveform of the combined cogging torque. It is understood from the diagram that, by combining the cogging torques of three phases, the cogging torque of the motor is reduced to 1/30 of the amplitude of the cogging torque of one phase.

Figure 3A:
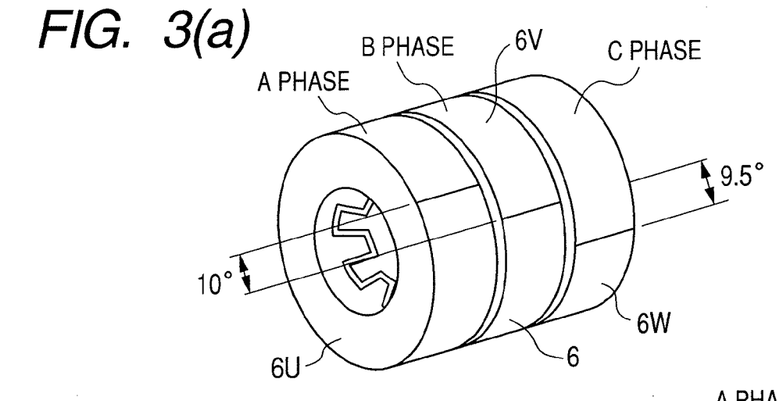
Figure 3B:
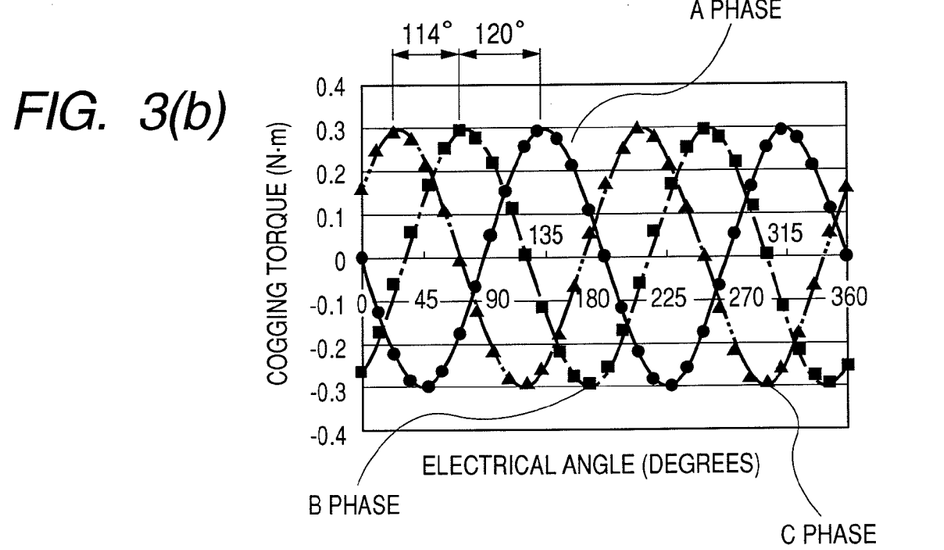
FIGS. 3(b) and 3(c) are diagrams showing a result of cogging torque calculation in the FEM analysis.
Figure 3C:
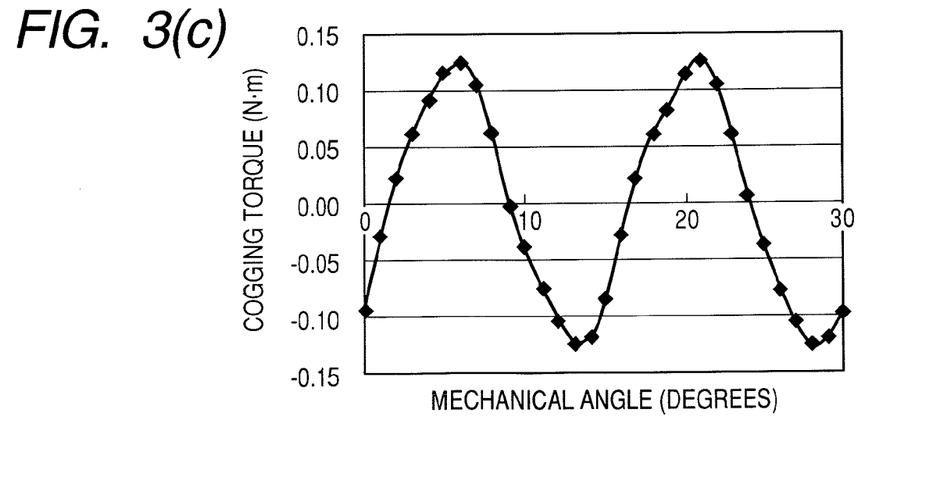

In manufacture of the motor, an error occurs in assembly. That is, it is a problem such that a deviation occurs in the positional relation within allowable dimension tolerance. In the case of a motor of 24 poles shown in FIGS. 2(a) to 2(d), one cycle of the electrical angle is 30° in mechanical angle. When the motor is designed with the allowable tolerance in assembly of about ±0.5°, the deviation amount in electric angle is ±6°. FIGS. 3(a) to 3(c) show an example in which one phase is shifted by 0.5° in mechanical angle due to an assembly error. For example, FIG. 3(a) is illustrated that the motor is assembled in state that phases A and B are shifted from each other by 10° in mechanical angle and a phase C to be shifted from the phase B by 10° is shifted from the phase B by 9.5°. In this case, the cogging torques in the phases have the relations that, as shown in FIG. 3(b), the torques in the phases A and B are shifted by 120° in electric angle, and the torques in the phases B and C are shifted by 114°. FIG. 3(c) shows the result of combination of the cogging torques of such three phases. As a result, the amplitude of the cogging torque becomes ten times or more as large as the design value by assembly error. The number of cogging torque cycles becomes two cycles in one cycle of electrical angle and is larger than six cycles of the original cogging torque of a three-phase motor. It causes low-frequency vibration and noise during motor rotation.

In order to reduce cogging torque due to an assembly error, it is necessary to improve the precision of assembly. However, when each degree of precision in parts, variations in the material characteristics, integration of assembly errors, and the like are considered, it is conceivable that it is very difficult to reduce the error to zero every manufacture.

In consideration of such a situation, the present invention provides a motor structure capable of performing adjustment to minimize cogging torque after assembly of a motor to reduce cogging torque caused by an assembly error. As described above, the cogging torque in a multiphase claw-pole motor largely varies due to the positional deviation (in other words, positional error) in the circumferential direction of each phase. Therefore, if being capable of adjusting the positions of multiple phase-stator units (namely, each of stator cores (6U, 6V, 6W) in the circumferential direction independent of each other after assembly, cogging torque can be adjusted so as to be reduced.

Figure 4:
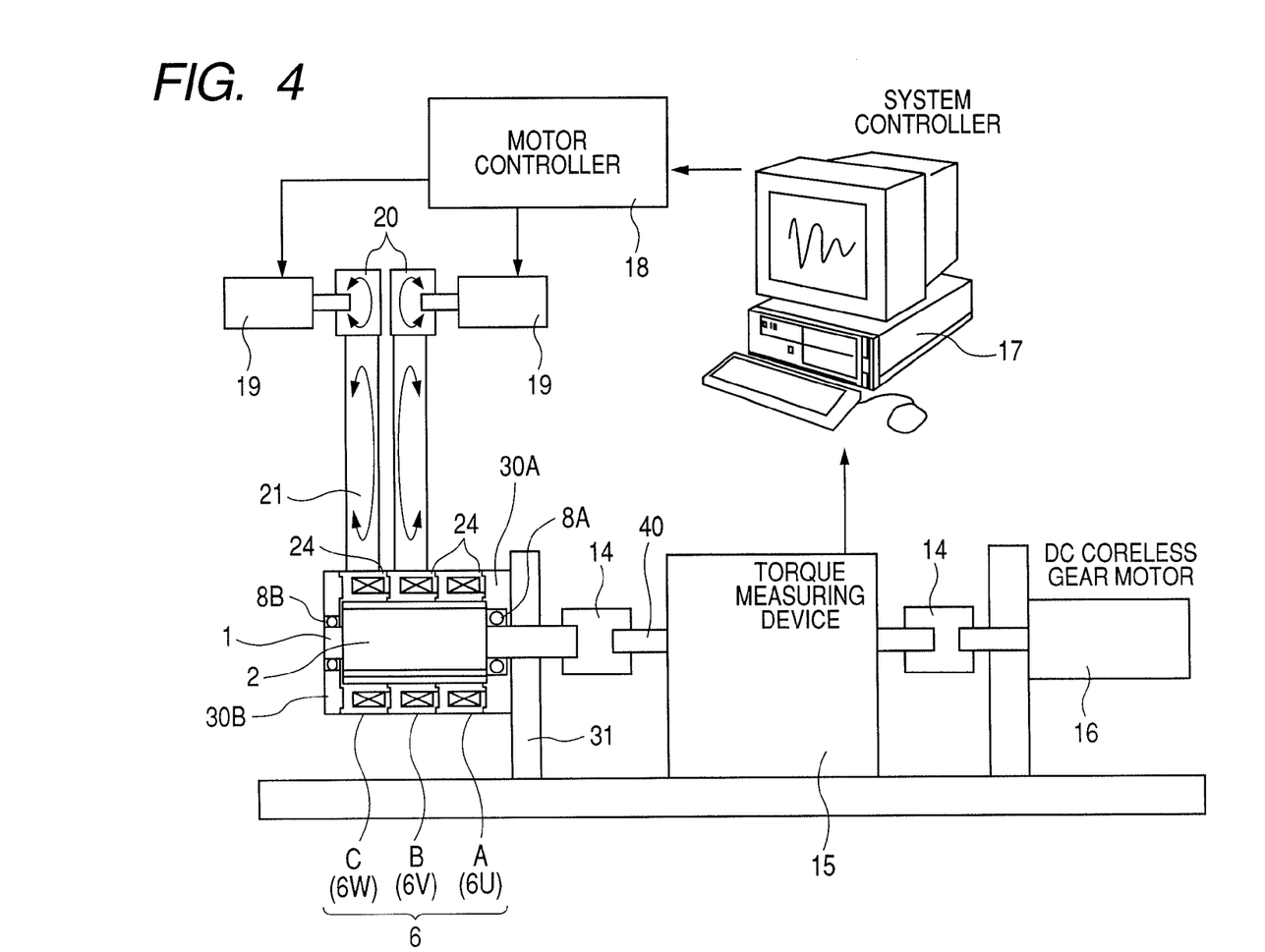
FIG. 4 is a diagram showing an example of the configuration of a cogging torque adjustment system of a multiphase claw-pole motor of the invention.

FIG. 4 shows an outline of a cogging torque adjusting system as an example of a system capable of adjusting cogging torque of an assembled claw-pole motor. A claw-pole motor shown in FIGS. 4 and 6 is one improved from that of FIG. 1 to realize the present invention, and it has a coverless structure which is not provided with a cover such as a motor housing around a stator 5, so that the position of each of the stator units (A, B, C) can be rotatably adjusted in the circumferential direction from the outside after assembly of the motor before securing the stator units. Stator units of respective phases can be assembled so as to assure concentricity by spigot and recess 24 (24a, 24b) or the like. Further, end faces of adjacent phases among stator cores (6U, 6V, 6W) are plated with a slidable material or molded with an organic material, so that stator cores can be rotatably adjusted smoothly in the circumferential direction independent of each other by an external force. Additionally, the joined stator units (stator cores 6U, 6V, 6W) are held at the both ends thereof in the axial direction by end brackets 30A and 30B through spigot and recess structure 24. According to such a structure, the phase positions of the stator cores can be adjusted phase by phase from the outside after assembly of the rotary machine before securing the stator units. The motor having such a structure is attached to an attachment plate 31 of a measuring/adjustment apparatus, and the shaft 1 of the motor is coupled to a shaft 40 of a torque measuring device 15 via a coupling 14. Furthermore, on other side of the torque measuring device 15, the shaft 40 is coupled to a motor 16 having a structure in which no cogging torque occurs (for example, a DC coreless motor 16). In the embodiment, in order to measure the cogging torque at very low speed (at a few rpm), a DC coreless motor 16 with a reduction gear is used as the motor for driving the multiphase claw-pole motor. Therefore the claw-pole motor under test is rotated at low speed by the DC coreless motor 16. Since there is no torque fluctuation in the DC coreless motor 16 and the torque measuring device 15, torque fluctuations in the claw-pole motor, that is, cogging torque can be measured without noise via the torque measuring device 15. The measured cogging torque is input to a controller 17 of a system and is evaluated. The system controller 17 controls a gear mechanism (18-21) to rotate the stator unit 6V and/or 6W for adjusting. The gear mechanism as a rotation providing comprises a motor controller 18 for controlling two adjustment motors 19 in accordance with instruction from the system controller 17, adjustment gears 20 attached to respective shafts of the adjustment motors 19, and timing belts 21 provided between respective gears 20 and stator cores 6V, 6W. In adjustment process of multiple stator units, for example, as the first, the cogging torque adjusting system rotates the stator core 6V of the phase B in a state where the stator unit 6U of the phase A is fixed. Thereby, at the position of the B-phase stator unit in the circumferential direction, a point where the amplitude of cogging torque is reduced, is obtained. Next, the cogging torque adjusting system rotates the stator core 6W of the phase C in a state where the stator unit 6V of the phase B is fixed. Thereby at the position of the C-phase stator unit in the circumferential direction, a point where the amplitude of cogging torque is reduced, is obtained. To completely fix the positional relations of the stator cores at the point after the cogging torque becomes the minimum, the stator cores (6U, 6V, 6W) are fixed by using fixing means such as adhesion or welding. Thus, a claw-pole motor with the small absolute value of cogging torque and reduced individual variations can be manufactured by the motor structure and the adjustment system.

Figure 5A:
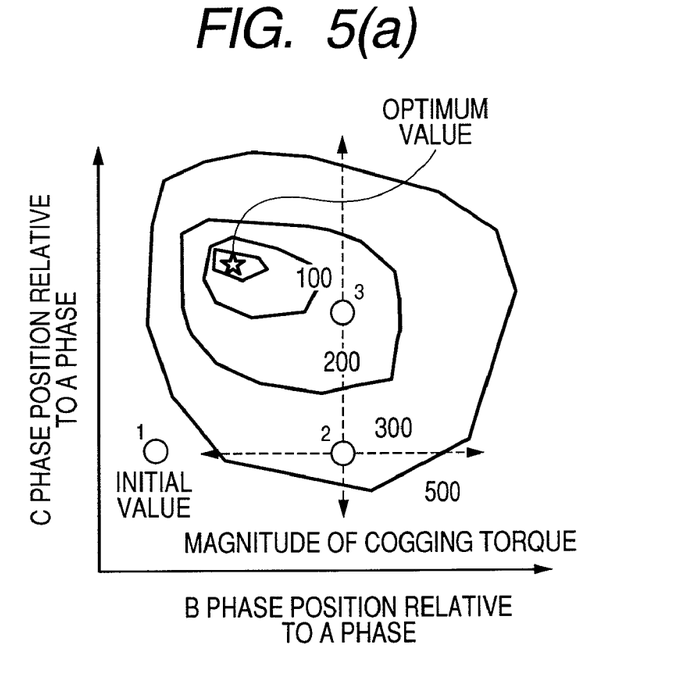
FIGS. 5(a) and 5(b) are diagrams showing an example of a method of obtaining an optimum point in the cogging torque adjustment system of the multiphase claw-pole motor of the invention.
Figure 5B:
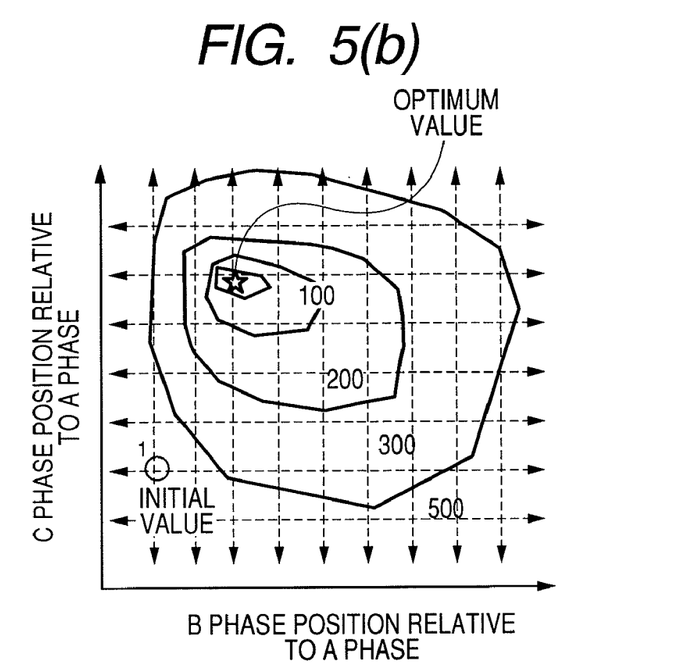

FIGS. 5(a) and 5(b) show an example of a method of obtaining the optimal solution (the cogging torque minimum point). The above-described method is shown in FIG. 5(a). In the method, search starts from the point of an initial value 1 and, in the state where the phase A is fixed, the search reaches the optimum point 2 by adjusting the phase B. After that, by adjusting the phase C, the search reaches the cogging minimum point 3. However, as shown in the diagram, there may be a cases the search does not reach the optimal point when the real optimum point is deviated from the center of contour lines. Instead of such a search method, as shown in FIG. 5(b), there is another method of measuring some points in a matrix and finding a point closest to the optimum point. The finer the net of the matrix is, the more accurately the optimum point can be found. Considering that as the number of measurement points increases, it takes more time for adjustment, it is also effective to combine methods in such a manner that a point close to the optimum point is found by the method (b) and the optimum point is reached by the method (a).

Second Embodiment

Figure 6A:
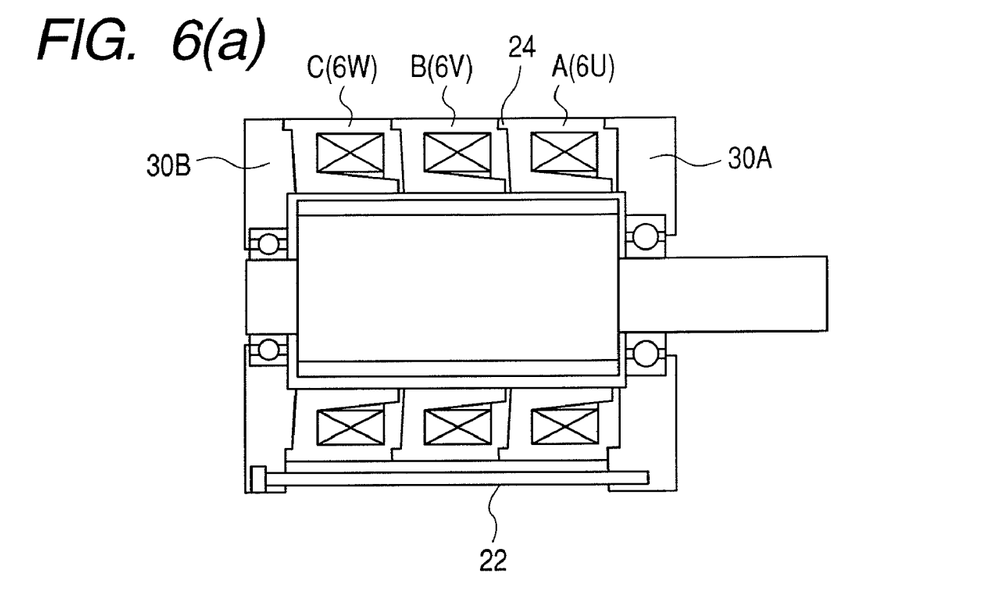
FIGS. 6(a) to 6(f) are diagrams showing the details of a motor structure necessary for adjusting cogging torque in the multiphase claw-pole motor of the invention.
Figure 6B:
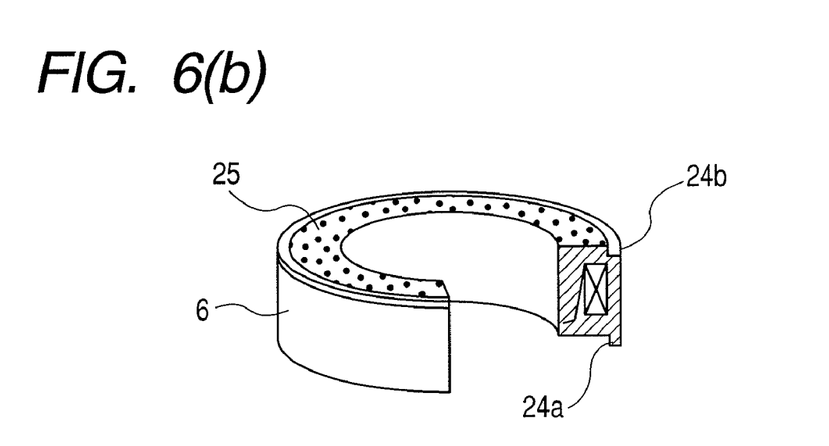

The structure of the multiple claw-pole motor capable of performing the adjustment of the cogging torque after assembly will now be detailed in FIGS. 6(a) to 6(f). FIG. 6(a) is a longitudinal section of a three-phase claw-pole motor. The structure of the motor is similar to that of the claw-pole motor shown in FIGS. 1(a) to 1(e) except for the adjusting function for cogging torque. In the claw-pole motor, both end faces in the axial direction of each stator core block 6 (6U, 6V, 6W) are provided with spigot-recess 24 (spigot 24a, recess 24b) for realizing the rotating function without shifting the axis center of stator core block to enable rotatably adjust for multiphase stator units after assembly of a motor. FIG. 6(b) shows a concrete structure on one phase stator unit example. The spigot (ring shaped-projection) 24a is formed in one of end faces in the axial direction of the stator core block 6 of one phase in a ring shape, and a recess 24b is formed on the other end face. The spigot and recess 24 (24a, 24b) are set to have a dimension tolerance where the motor can rotate while minimizing backlash (gap) when the spigot and the recess engage with each other. For example, the outside diameter (whose value varies according to the absolute value of the diameter) of the spigot 24a is set to be slightly larger than the inside diameter of the recess 24b so as to have tolerance such as fit tolerance of H7-g6. As a result, adjacent stator cores 6 are mutually rotatable independent of each other while maintaining concentricity is obtained. The shape of the spigot-recess structure 24 is not limited to the shape of the embodiment but any shape may be employed as long as concentricity is maintained.

When performing the adjustment of the stator cores (stator units), it is required that the stator cores have to rotate with low friction to obtain smooth relative rotations of them. However, when performing the adjustment in the state of sandwiching the stator cores 6 (6U, 6V, 6W) firmly by end brackets 30a and 30b with fastening means such as a through bolt 22 as shown in FIG. 6 (*a*), friction resistance is high in contact between dust core surfaces, and there may be a case where the stator cores mutually cannot rotate for adjustment. As a solution in such a case, a method of coating, plating, or depositing a material having excellent slidability (slip) such as polytetrafluoroethylene on both end faces in the axial direction of the stator core block is effective. As the material having excellent slidability, a combination of different materials such as copper and nickel may be used, or different materials may be used for the both end faces. Since the stator cores at both ends of a combination of them also slide on end brackets, similar process has to be performed also on the faces of the core sides of the end brackets. With the process, also after the brackets 30a, 30b and the stator core 6 (6U,6V,6W) are firmly assembled in the axial direction with the through bolt 22 or the like, the phase positional relations of the stator cores can be adjusted phase by phase with application of a rotational force from the outside. The slide faces of the stator cores can be also made of another material. Similar functions can be also achieved by providing an interphase plate made of a material having excellent slidability between the stator core blocks or between the end bracket and the stator core block. An organic material may be used as the material and may be integrated with the core block.

Figure 6C:
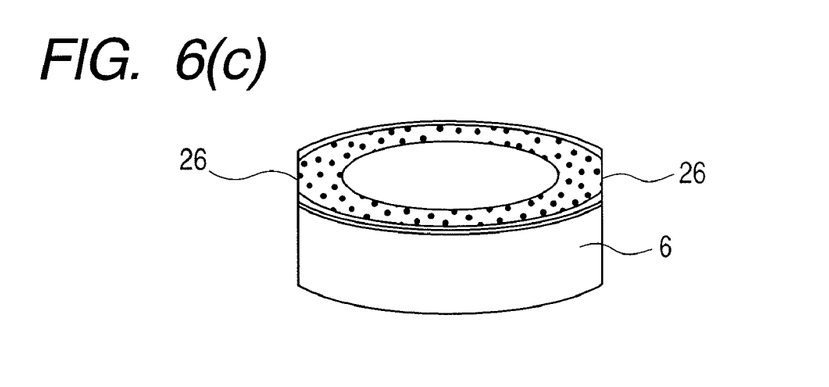
Figure 6D:
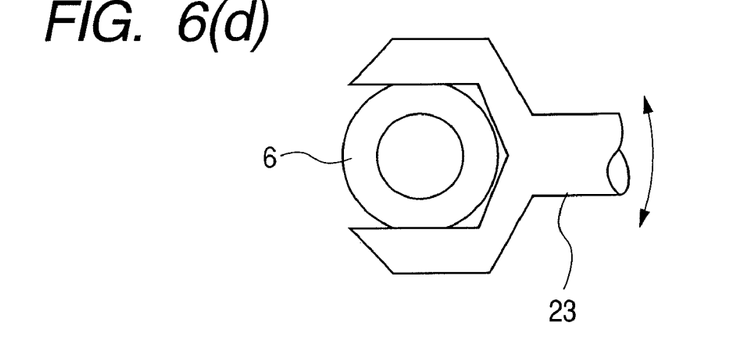
Figure 6E:
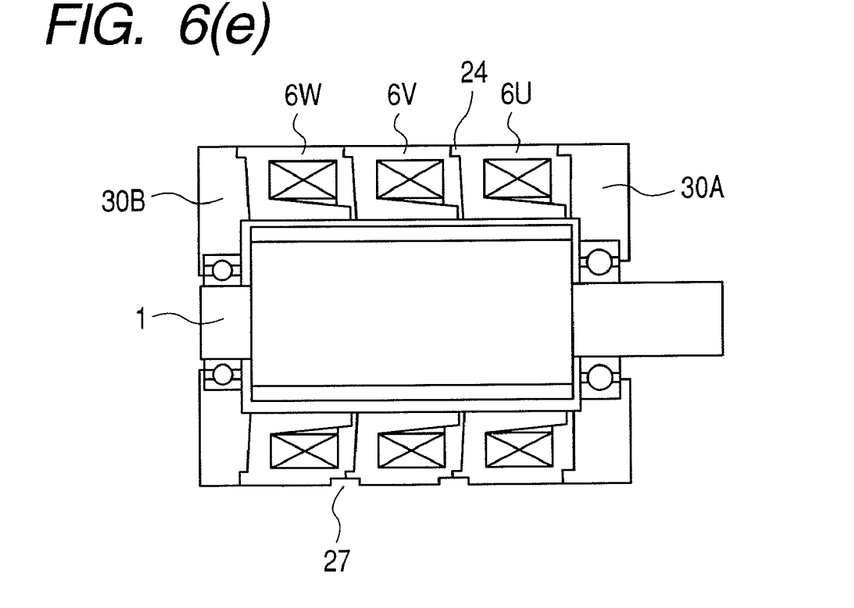
Figure 6F:
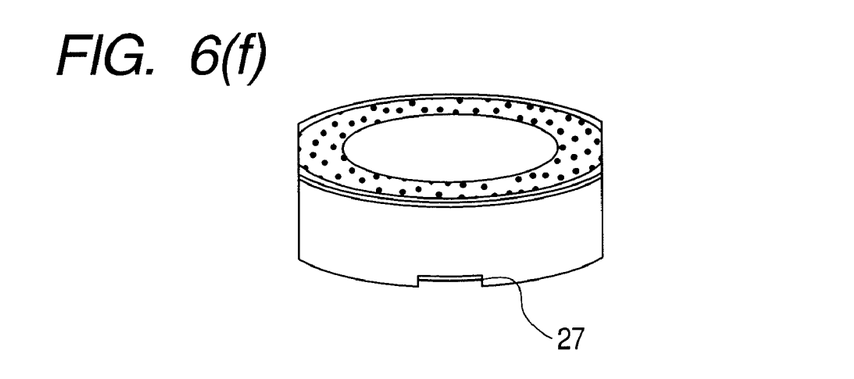

Next, the structure of the stator core block in the case of applying a rotation force from the outside will be described. FIG. 6(*c*) is a perspective view of one phase in the stator core block 6. When the block 6 has a cylindrical shape, it is not easy to grip the block from the outside and to apply the rotational force. In order to such a problem, flat face-cuts 26 such as D shaped-face cuts are formed in a part of the stator core block 6 as shown in FIG. 6(*c*). With the flat face-cuts 26, the rotational force can be easily transferred with a tool having a spanner shape as shown in FIG. 6(*d*) or a holder of a rotating mechanism. The outer shape of each stator core block 6 is characterized in that the rotational force from the outside can be transferred. In the adjustment mechanism shown in FIG. 4, the rotational force is transferred by the timing belt 21. In this case, desirably, the outer periphery of the core block 6 has a gear portion which engages with the timing belt 21. Obviously, the object can be also achieved by a cylindrical pulley structure using friction and capable of applying the rotational force by the frictional force.

Finally, processes after the above-mentioned cogging torque minimizing adjustment will be described. After adjusting the stator core block (stator units) 6U, 6V, and 6W for minimizing the cogging torque of the motor, the positional relations of the stator core block have to be fixed. To realize it, notch grooves 27 for fixation are formed at least around boundaries of the outer peripheries of the stator core blocks (6U, 6V, 6W), and the boundaries thereof are joined by means such as welding or adhesion after the cogging torque adjustment of the motor. With the structure, after the motor is assembled, the positional relations of the stator cores can be prevented from being broken by a disturbance (rotational force, vibration, or the like) from the outside.

Third Embodiment

Figure 7:
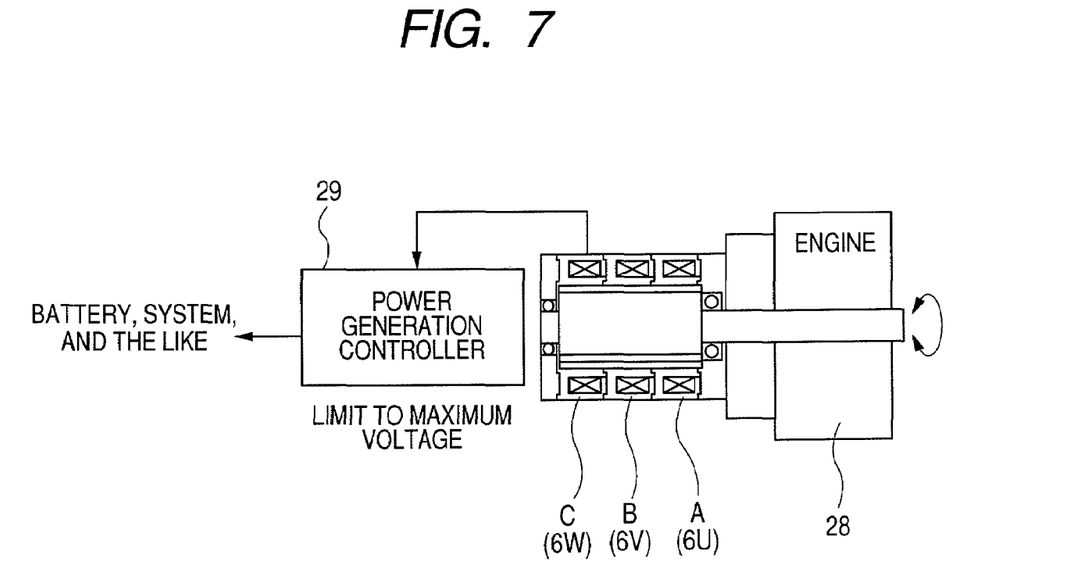
FIG. 7 is a diagram showing an example of a system configuration in the case of using the multiphase claw-pole structure of the invention as a motor or a generator.
Figure 8:
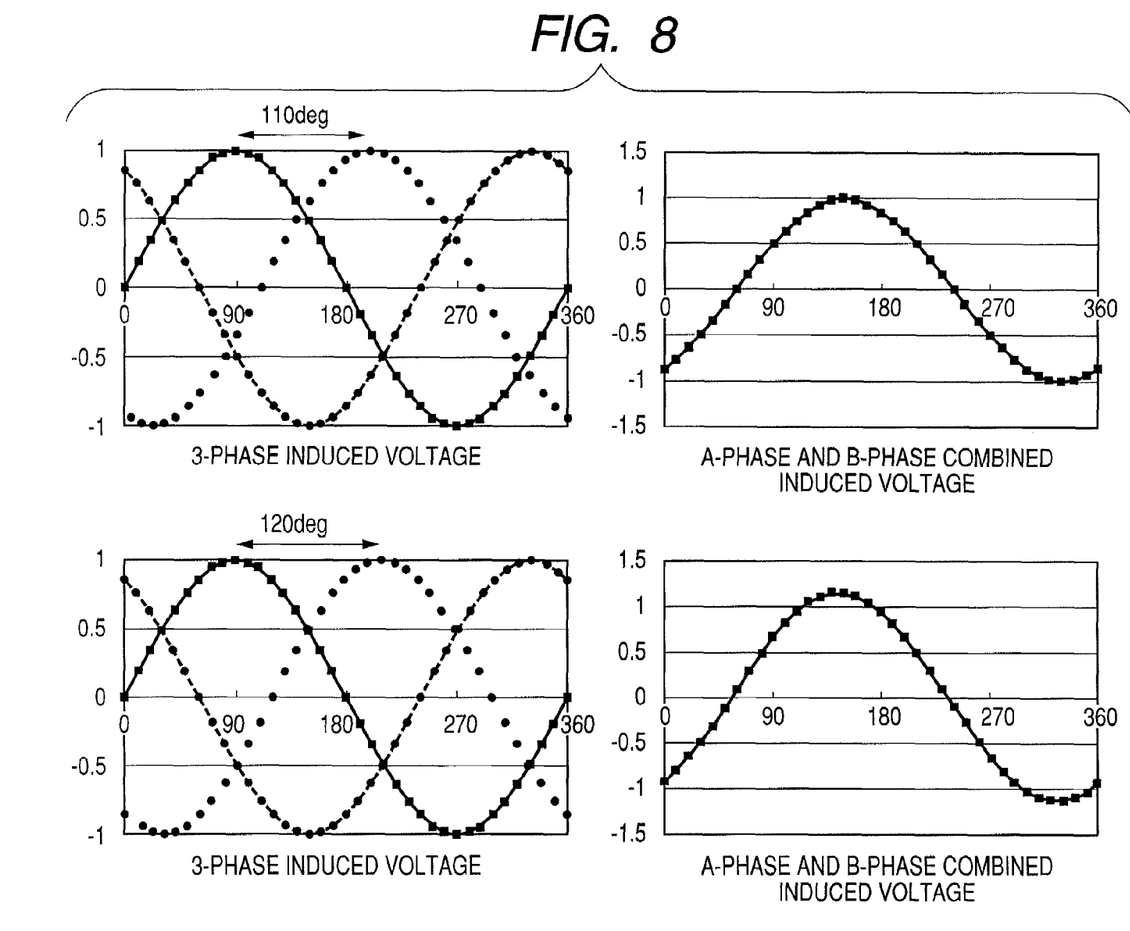
FIG. 8 is a diagram showing an example of a method of adjusting voltage to a regulated voltage in the case of using the multiphase claw-pole structure of the invention as a motor or a generator.

Next, an embodiment of a motor or a generator system applying the mechanism capable of rotating the above-mentioned stator core blocks 6 (6U, 6V, 6W) will be described. For example, as stated above, when changing positions of the stator core blocks 6 in each phase, the electric characteristics of the motor or generator can be changed. Consequently, when applying the above-mentioned stator core rotatable mechanism to generator, the output of the generator, if any, has an excess increase of voltage by increase in the rotational speed of the generator, it is possible to control the output voltage so as to reduce into allowable value by changing positions of the stator cores of multiphase. FIG. 7 is a generator system for generating an electric power by rotation torque of the internal combustion engine 28. In FIG. 7, when the generator output voltage, which is supplied to power generation controller 29 for equipment such as a battery, various control systems and the like, exceeds an upper limit value due to an unexpected excess speed of the engine speed, the output voltage generated by the generator can be controlled by changing positions of the stator cores of multiphase. That is, when the excess rotational speed is detected, adjusting the positional relations of the stator core of one phase or two phases of the claw-pole generator, the voltage generated by the generator can be reduced as shown in FIG. 8. Thus, the controller 29 can be prevented from being damaged. Since the adjustment direction is the direction of increasing the cogging torque, it is effective to prevent the system from being damaged with increase in the brake force. The method can be used for a system such as a vehicle, a generator such as an emergency engine generator, or a wind power generator.

Since the electric characteristics can be changed by rotating the core block, an output of the generator or the motor can be changed. Thus, by rotating the core block, an output of the generator or motor can be controlled.

As described above, the multiphase claw-pole type motor or generator of the invention can have the minimum cogging torque and reduced variations, so that the motor or generator smoothly rotating with small torque pulsation can be obtained. Since the cogging torque and the torque pulsation can be reduced, vibrations and noise of the motor or generator can be reduced, and an advantage such as improvement in quietness of a system to which the motor or generator is applied can be expected. Further, an output of the generator or motor can be also controlled.

What is claimed is:

1. The multiphase claw-pole type electric rotary machine with two or more phases-stator units arranged phase by phase in an axial direction of the electric rotary machine, wherein each phase stator unit comprises a pair of complementary-opposed claw pole core blocks and a ring-shaped stator coil sandwiched therebetween, characterized in that the stator units comprise structures rotatably adjustable independent of each other in their phase positional relations while maintaining concentricity of said stator units after assembly of the rotary machine before said stator units being secured, wherein the two or more phase-stator units are joined to each other in the axial direction of the electric rotary machine through spigot and recess structures respectively to maintain concentricity of the stator units, and wherein a combination of the stator units are held at the both ends of the combination in the axial direction by end brackets through spigot and recess structures so that the positions of the stator cores can be rotatably adjustable phase by phase from the outside of the rotary machine after assembly of the rotary machine.

2. The multiphase claw-pole type electric rotary machine according to claim 1, wherein at least an outer periphery around a boundary between adjacent core blocks of the stator units is provided with a recess configured to be used for securing the stator units.

3. The multiphase claw-pole type electric rotary machine according to claim 1, wherein each of the core blocks has a shape with flat faces configured to be easily held by a tool for applying a rotational force to the core block from the outside of the rotary machine.

4. The multiphase claw-pole type electric rotary machine with two or more phases-stator units arranged phase by phase in an axial direction of the electric rotary machine, wherein each phase stator unit comprises a pair of complementary-opposed claw pole core blocks and a ring-shaped stator coil sandwiched therebetween, characterized in that the stator units comprise structures rotatably adjustable independent of each other in their phase positional relations while maintaining concentricity of said stator units after assembly of the rotary machine before said stator units being secured, and wherein one or both of adjacent faces in the axial direction of respective core blocks of the stator units is provided with a material having slippery characteristics for improving slip.

5. The multiphase claw-pole type electric rotary machine according to claim 4, wherein the material is comprised of polytetrafluoroethylene, nickel, or copper.

6. The multiphase claw-pole motor according to claim 4, wherein the material is coated, applied, or deposited on said one or both of the adjacent faces.

7. The multiphase claw-pole type electric rotary machine according to claim 4, wherein at least an outer periphery around a boundary between adjacent core blocks of the stator units is provided with a recess configured to be used for securing the stator units.

8. The multiphase claw-pole type electric rotary machine according to claim 4, wherein each of the core blocks has a shape with flat faces configured to be easily held by a tool for applying a rotational force to the core block from the outside of the rotary machine.

9. The multiphase claw-pole type electric rotary machine with two or more phases-stator units arranged phase by phase in an axial direction of the electric rotary machine, wherein each phase stator unit comprises a pair of complementary-opposed claw pole core blocks and a ring-shaped stator coil sandwiched therebetween, characterized in that the stator units comprise structures rotatably adjustable independent of each other in their phase positional relations while maintaining concentricity of said stator units after assembly of the rotary machine before said stator units being secured, and wherein an interphase plate is provided between adjacent faces in the axial direction of the core blocks of the stator units.

10. The multiphase claw-pole type electric rotary machine according to claim 9, wherein the interphase plate is comprised of an organic material having slippery characteristics for excellent slidability or a metal material.

11. The multiphase claw-pole type electric rotary machine according to claim 9, wherein at least an outer periphery around a boundary between adjacent core blocks of the stator units is provided with a recess configured to be used for securing the stator units.

12. The multiphase claw-pole type electric rotary machine according to claim 9, wherein each of the core blocks has a shape with flat faces configured to be easily held by a tool for applying a rotational force to the core block from the outside of the rotary machine.

13. A system for adjusting cogging torque of a multiphase claw-pole type electric rotary machine, comprising:

a multiphase claw-pole type electric rotary machine with two or more phases-stator units arranged phase by phase in an axial direction of the electric rotary machine, wherein each phase stator unit comprises a pair of complementary-opposed claw pole core blocks and a ring-shaped stator coil sandwiched therebetween, and the stator units are comprised of structures rotatably adjustable independent of each other in their phase positional relations while maintaining concentricity of said stator units after assembly of the rotary machine; and a gear mechanism for rotatably adjusting at least one of the core blocks from the outside of the rotary machine.

14. The system for adjusting cogging torque according to claim 13, further comprising:

an apparatus for measuring cogging torque of the electric rotary machine; and a controller for giving an instruction for adjustment of the stator units to the gear mechanism so as to reduce the cogging torque on the basis of a result of measurement of the cogging torque.

15. The system for adjusting cogging torque according to claim 14, wherein the controller obtains an optimum value of the cogging torque by, as a method of obtaining an optimum condition, using a combination of two or more methods including a method of measuring points of a number of axes in a matrix and a method of searching for an optimum point independently of each other.

16. A generator system using a multiphase claw-pole type generator, comprising:

the generator with two or more phases-stator units arranged phase by phase in an axial direction of the generator, wherein each phase stator unit comprises a pair of complementary-opposed claw pole core blocks and a ring-shaped stator coil sandwiched therebetween, and wherein the stator units are comprised of structures rotatably adjustable independent of each other in their phase positional relations while maintaining concentricity of said stator units, after assembly of the generator, and a rotation providing device for controlling an output of the generator by rotating at least one of the stator core blocks from the outside of the rotary machine.

17. The generator system according to claim 16, wherein the stator core block is rotated so that the output voltage of the generator does not exceed equal to or larger than a preset value.

18. A motor system using a multiphase claw-pole motor, comprising:

the motor with two or more phases-stator units arranged phase by phase in an axial direction of the motor machine, wherein each phase stator unit comprises a pair of complementary-opposed claw pole core blocks and a ring-shaped stator coil sandwiched therebetween, and wherein the stator units are comprised of structures rotatably adjustable independent of each other in their phase positional relations while maintaining concentricity of said stator units, after assembly of the motor, and a rotation providing device for controlling an output of the motor by rotating at least one of the stator core blocks from the outside of the motor.

* * * * *